United States Patent
Gerard

(10) Patent No.: US 12,275,853 B2
(45) Date of Patent: Apr. 15, 2025

(54) PROCESS FOR PREPARING SURFACE-REACTED CALCIUM CARBONATE

(71) Applicant: Omya International AG, Oftringen (CH)

(72) Inventor: Daniel E. Gerard, Basel (CH)

(73) Assignee: OMYA INTERNATIONAL AG, Oftringen (CH)

( * ) Notice: Subject to any disclaimer, the term of this patent is extended or adjusted under 35 U.S.C. 154(b) by 825 days.

(21) Appl. No.: 17/593,868

(22) PCT Filed: Apr. 7, 2020

(86) PCT No.: PCT/EP2020/059896
§ 371 (c)(1),
(2) Date: Sep. 27, 2021

(87) PCT Pub. No.: WO2020/212204
PCT Pub. Date: Oct. 22, 2020

(65) Prior Publication Data
US 2022/0169861 A1 Jun. 2, 2022

(30) Foreign Application Priority Data

Apr. 16, 2019 (EP) ..................................... 19169504

(51) Int. Cl.
*C01F 11/18* (2006.01)
*C09C 1/02* (2006.01)

(52) U.S. Cl.
CPC .............. *C09C 1/022* (2013.01); *C01F 11/18* (2013.01); *C01F 11/185* (2013.01); *C01P 2004/61* (2013.01); *C01P 2006/12* (2013.01); *C01P 2006/14* (2013.01)

(58) Field of Classification Search
CPC ......... C09C 1/022; C01F 11/18; C01F 11/185
See application file for complete search history.

(56) References Cited

U.S. PATENT DOCUMENTS

| | | | |
|---|---|---|---|
| 4,219,590 A | 8/1980 | Shibazaki et al. | |
| 5,043,017 A | 8/1991 | Passaretti | |
| 5,584,923 A | 12/1996 | Wu | |
| 5,647,902 A | 7/1997 | Wu | |
| 5,711,799 A | 1/1998 | Snowden et al. | |
| 6,666,953 B1 | 12/2003 | Gane et al. | |
| 9,017,518 B2 | 4/2015 | Buri et al. | |
| 9,862,830 B2 | 1/2018 | Gane et al. | |
| 10,633,259 B2 * | 4/2020 | Rentsch | C09C 1/021 |
| 2013/0036948 A1 * | 2/2013 | Fernandez | C01F 11/183 106/725 |
| 2017/0283619 A1 * | 10/2017 | Pohl | C09J 11/04 |

FOREIGN PATENT DOCUMENTS

| | | |
|---|---|---|
| EP | 1712523 A1 | 10/2006 |
| EP | 1712597 A1 | 10/2006 |
| EP | 2447213 A1 | 10/2010 |
| EP | 2524898 A1 | 11/2010 |
| EP | 2371766 A1 | 10/2011 |
| EP | 2264109 B1 | 1/2012 |
| EP | 2722368 A1 | 4/2014 |
| EP | 2770017 B1 | 9/2015 |
| EP | 3275946 A2 | 7/2016 |
| EP | 2245095 B1 | 2/2017 |
| EP | 2997833 B1 | 1/2018 |
| EP | 3275947 A1 | 1/2018 |
| EP | 3275948 A1 | 1/2018 |
| EP | 3042878 B1 | 3/2019 |
| WO | 9708247 A1 | 3/1997 |
| WO | 9820079 A1 | 5/1998 |
| WO | 9902608 A1 | 1/1999 |
| WO | 2004083316 | 9/2004 |
| WO | 2005121257 A2 | 12/2005 |
| WO | 2009074492 A1 | 6/2009 |
| WO | 2013142473 A1 | 9/2013 |
| WO | 2016113285 A1 | 7/2016 |
| WO | 2018159484 A1 | 9/2018 |

OTHER PUBLICATIONS

International Search Report and Written Opinion in International Application No. PCT/EP2020/059896. Jul. 7, 2020.
Kumar et al., "Synthesis of Carbonated Calcium Phosphate Ceramics Using Microwave Irradiation", Biomaterials, vol. 21, pp. 1623-1629. 2000.
Gane et al., "Void Space Structure of Compressible Polymer Spheres and Consolidated Calcium Carbonate Paper—Coating Formulations", Industrial & Engineering Chemistry Research, vol. 35, No. 5, pp. 1753-1765. 1996.

* cited by examiner

*Primary Examiner* — Stuart L Hendrickson
(74) *Attorney, Agent, or Firm* — Heslin Rothenberg Farley & Mesiti P.C.

(57) ABSTRACT

The present invention relates to a process for producing a surface-reacted calcium carbonate, wherein a calcium carbonate-comprising material is treated with at least one inorganic acid and carbon dioxide in an aqueous medium to form an aqueous suspension of surface-reacted calcium carbonate, wherein the at least one water-soluble, inorganic magnesium salt is added before, during and/or after the treatment step. Furthermore, the present invention relates to a surface-reacted calcium carbonate obtained from said process and its use.

20 Claims, No Drawings

PROCESS FOR PREPARING SURFACE-REACTED CALCIUM CARBONATE

CROSS REFERENCE TO RELATED APPLICATIONS

This application is a U.S. National Phase filing under 35 U.S.C. § 371 of International Application No. PCT/EP2020/059896, filed on Apr. 7, 2020, and published as WO 2020/212204 on Oct. 22, 2020. PCT/EP2020/059896 claims priority from European Patent Application No. 19169504.8, filed on Apr. 16, 2019. The entire contents of each of these prior applications are hereby incorporated herein by reference.

The present invention relates to a process for preparing surface-reacted calcium carbonate, a surface-reacted calcium carbonate obtained by said process and its use.

In practice, calcium carbonate is used in huge quantities in the paper, paint, rubber and plastics industries for various purposes such as coatings, fillers, extenders and pigments for papermaking as well as aqueous lacquers and paints and in water treatment, and notably as a means of removing inorganic materials such as heavy metals and/or pharmaceutical waste such as polycyclic compounds, cholesterol and/or endocrine disrupting compounds (EDC).

With respect to precluding aggregation of calcium carbonate particles and enhancing the affinity of these particles with a substance to which the particles are being added, for example as a filler or flocculating agent, the physical and chemical properties of the surfaces of such calcium carbonate particles are amended by treating the calcium carbonate with fatty acid or a sodium salt of a fatty acid, resin acid or other acids.

In the art, several approaches for improving the chemical and physical properties of calcium carbonate have been proposed. For example, U.S. Pat. No. 4,219,590 A describes a method for improving calcium carbonate by causing calcium carbonate particles to undergo contact reaction with an acid gas capable of reacting with calcium carbonate to render the particle size approximating to finely monodisperse and, at the same time, coating the surface of the calcium carbonate particles with the calcium salt of the acid of the acid gas. U.S. Pat. No. 6,666,953 B1 relates to a pigment, filler or mineral containing a natural calcium carbonate, treated with one of more providers of $H_3O^+$ ions and gaseous $CO_2$, allowing a reduction in the weight of paper for a constant surface area without loss of physical properties when it is used as a pigment or coating filler for said paper. WO 99/02608 A1 describes a method of producing a high solids slurry of an acid-resistant precipitated calcium carbonate, wherein a solids slurry is treated with a chemical additive, such as sodium aluminate, in order to impart acid resistance to the calcium carbonate.

Additionally, U.S. Pat. Nos. 5,584,923 A, 5,647,902 A, 5,711,799 A, WO 97/08247 A1 and WO 98/20079 A1, respectively, describe calcium carbonate which is acid-resistant to enable its use as a filler material in the making of neutral to weakly acidic paper, and a process for producing this acid-resistant calcium carbonate.

Furthermore, WO 2005/121257 A2 discloses a method for producing a dry mineral pigment characterized in that it contains a product formed in situ by the multiple reaction of a calcium carbonate and with the reaction product or products of said carbonate with gaseous $CO_2$ formed in situ and/or from an external supply; and with at least one compound of formula R-X. WO 2004/083316 A1 refers to mineral pigments containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminum silicate and/or at least one synthetic silica and/or at least one calcium silicate and/or at least one silicate of a monovalent salt such as sodium silicate and/or potassium silicate and/or lithium silicate, preferably such as sodium silicate and/or at least one aluminum hydroxide and/or at least one sodium and/or potassium aluminate, used in papermaking applications, such as mass filling and/or paper coating.

U.S. Pat. No. 5,043,017 A relates to calcium carbonate, acid-stabilized by the addition to finely divided calcium carbonate of one of a calcium-chelating agent and a conjugate base, such as sodium hexametaphosphate, followed by the addition of an acid, such as phosphoric acid.

EP 2 264 109 A1 relates to a process for preparing a surface-reacted calcium carbonate, wherein calcium carbonate is treated with at least one acid having a $pK_a$ of less than or equal to 2.5 and at least one water-soluble non-polymeric organic and/or inorganic weak acid and/or a hydrogen salt thereof, wherein the at least one water soluble non-polymeric organic and/or inorganic weak acid has a $pK_a$ of greater than 2.5, and wherein its corresponding acid anion is capable of forming water-insoluble calcium salts. WO 2016/113285 A1 relates to a process for producing a surface-treated calcium carbonate with improved stability in environments with a pH of 4.5 to 7, wherein calcium carbonate, at least one acid having a $pK_a$ value from 0 to 8, when measured at 20° C., and at least one conjugate base are brought into contact to form surface-treated calcium carbonate.

A process for producing surface-reacted calcium carbonate, wherein a calcium carbonate-comprising material is treated with phosphoric acid, carbon dioxide, and specific dicarboxylic acids, in an aqueous medium to form an aqueous suspension of surface-reacted calcium carbonate is described in EP 3 275 948 A1.

However, there is still a need in the art on economic methods for preparing high surface area materials allowing for the provision of specific calcium carbonate materials for the desired purpose.

Thus, it would be desirable to have a process available which allows for preparing surface-reacted calcium carbonate and provides the possibility of modifying the specific BET surface area and/or the porosity of the calcium carbonate in a predetermined way.

Accordingly, it is an object of the present invention to provide an economic process for preparing a surface-reacted calcium carbonate, in which the specific BET surface area and/or the porosity of the calcium carbonate can be modified in a predetermined way. It would also desirable that the process can be carried out with standard equipment. Another object of the present invention is to provide a process, in which the surface-reacted calcium carbonate can be prepared in high yield.

It is also an object of the present invention to provide a material, which is at least partially derivable from natural sources and is not persistent in the environment, but easily biodegradable. It is desirable that the obtained surface-reacted calcium carbonate particles can be used as filler material so that they may replace conventionally used fillers in various applications or supplement them. It is also desirable that the functionality of the surface-reacted calcium carbonate particles can be controlled and can be tailored for a specific application. Furthermore, it is an object of the present invention to provide a material which is less prone to microbial contamination.

The foregoing and other objects are solved by the subject-matter as defined in the independent claims.

According to one aspect of the present invention, a process for producing a surface-reacted calcium carbonate is provided, comprising the steps of:

a) providing a calcium carbonate-comprising material,
b) providing at least one inorganic acid,
c) providing at least one water-soluble, inorganic magnesium salt, and
d) treating the calcium carbonate-comprising material of step a) with the at least one inorganic acid of step b) and carbon dioxide in an aqueous medium to form an aqueous suspension of surface-reacted calcium carbonate, wherein the carbon dioxide is formed in situ by the inorganic acid treatment and/or is supplied by an external source, and wherein the at least one water-soluble, inorganic magnesium salt of step c) is added before, during and/or after step d).

According to a further aspect, a surface-reacted calcium carbonate obtainable by a process according to the present invention is provided.

According to still a further aspect, use of a surface-reacted calcium carbonate according to the present invention in polymer applications, paper coating applications, paper making, paints, coatings, sealants, printing inks, adhesives, food, feed, pharmaceuticals, concrete, cement, cosmetics, water treatment, engineered wood applications, plasterboard applications, packaging applications and/or agricultural applications, preferably in polymer and/or food applications, is provided.

According to still a further aspect an article comprising a surface-reacted calcium carbonate according to the present invention is provided, wherein the article is selected from paper products, engineered wood products, plasterboard products, polymer products, hygiene products, medical products, healthcare products, food products, feed products, filter products, woven materials, nonwoven materials, geotextile products, agriculture products, horticulture products, clothing, footwear products, baggage products, household products, industrial products, packaging products, building products, and construction products.

Advantageous embodiments of the present invention are defined in the corresponding subclaims.

According to one embodiment the calcium carbonate-comprising material is a natural ground calcium carbonate and/or a precipitated calcium carbonate, preferably the natural ground calcium carbonate is selected from the group consisting of marble, chalk, limestone, and mixtures thereof, and/or the precipitated calcium carbonate is selected from the group consisting of precipitated calcium carbonates having an aragonitic, vateritic or calcitic crystal form, and mixtures thereof. According to a further embodiment the calcium carbonate-comprising material is in form of particles having a weight median particle size $d_{50}$ (wt) from 0.05 to 10 μm, preferably from 0.2 to 5.0 μm, more preferably from 0.4 to 3.0 μm, and most preferably from 0.6 to 1.2 μm, and/or a weight top cut particle size $d_{98}$ (wt) from 0.15 to 55 μm, preferably from 1 to 30 μm, more preferably from 2 to 18 μm, and most preferably from 3 to 7 μm.

According to one embodiment the at least one inorganic acid is selected from the group consisting of hydrochloric acid, sulphuric acid, sulphurous acid, phosphoric acid, an inorganic acid salt thereof, and mixtures thereof, preferably the at least one inorganic acid is selected from the group consisting of hydrochloric acid, sulphuric acid, sulphurous acid, phosphoric acid, $H_2PO_4^-$, being at least partially neutralised by a cation selected from $NH_4^+$, $Li^+$, $Na^+$ and/or $K^+$, $HPO_4^{2-}$, being at least partially neutralised by a cation selected from $NH_4^+$, $Li^+$, $Na^{+'}$ $K^+$, and/or $Ca^{2+}$, and mixtures thereof, more preferably the at least one inorganic acid is selected from the group consisting of hydrochloric acid, sulphuric acid, sulphurous acid, phosphoric acid, or mixtures thereof, and most preferably the at least one inorganic acid is phosphoric acid. According to a further embodiment the at least one inorganic acid is provided in an amount from 1 to 60 wt.-%, based on the total weight of the calcium carbonate-comprising material, preferably from 5 to 55 wt.-%, more preferably from 7 to 50 wt.-%, and most preferably from 10 to 40 wt.-%.

According to one embodiment the at least one water-soluble, inorganic magnesium salt is selected from the group consisting of magnesium chloride, magnesium nitrate, magnesium sulfate, magnesium hydrogen sulfate, magnesium bromide, magnesium iodide, magnesium chlorate, magnesium iodate, hydrates thereof, and mixtures thereof, preferably the at least one water-soluble, inorganic magnesium salt is selected from the group consisting of magnesium bromide, magnesium nitrate, magnesium sulfate, hydrates thereof, and mixtures thereof, and most preferably the at least on water-soluble, inorganic magnesium salt is magnesium sulfate or a hydrate thereof. According to a further embodiment the at least one water-soluble, inorganic magnesium salt is provided in an amount from 0.3 to 270 mmol $Mg^{2+}$/mol $Ca^{2+}$ of the calcium carbonate-comprising material, preferably from 0.7 to 200 mmol $Mg^{2+}$/mol $Ca^{2+}$ of the calcium carbonate-comprising material, more preferably from 2 to 135 mmol $Mg^{2+}$/mol $Ca^{2+}$ of the calcium carbonate-comprising material, and most preferably from 3 to 70 mmol $Mg^{2+}$/mol $Ca^{2+}$ of the calcium carbonate-comprising material.

According to one embodiment in step d) the calcium carbonate-comprising material is treated with a solution comprising the at least one inorganic acid of step b) and the at least one water-soluble, inorganic magnesium salt of step c). According to a further embodiment the carbon dioxide is formed in situ by the inorganic acid treatment and/or step d) is carried out at a temperature from 20 to 90° C., preferably from 30 to 85° C., more preferably from 40 to 80° C., even more preferably from 50 to 75° C., and most preferably from 60 to 70° C. According to still a further embodiment the calcium carbonate-comprising material is a natural ground calcium carbonate, the at least one inorganic acid is phosphoric acid, the at least one water-soluble, inorganic magnesium salt is selected from the group consisting of magnesium bromide, magnesium nitrate, magnesium sulfate, hydrates thereof, and mixtures thereof, and preferably is magnesium sulfate or a hydrate thereof, and in step d) the calcium carbonate-comprising material is treated with a solution comprising the at least one inorganic acid of step b) and the at least one water-soluble, inorganic magnesium salt of step c).

According to one embodiment the surface-reacted calcium carbonate has a specific surface area of from 20 $m^2/g$ to 200 $m^2/g$, preferably from 30 $m^2/g$ to 180 $m^2/g$, more preferably from 35 $m^2/g$ to 150 $m^2/g$, even more preferably from 40 $m^2/g$ to 130 $m^2/g$, and most preferably from 50 $m^2/g$ to 100 $m^2/g$, measured using nitrogen and the BET method. According to a further embodiment the surface-reacted calcium carbonate has an intra-particle intruded specific pore volume in the range from 0.1 to 2.3 cm$^3$/g, preferably from 0.2 to 2.0 cm$^3$/g, more preferably from 0.3 to 1.8 cm$^3$/g, and most preferably from 0.35 to 1.6 cm$^3$/g, calculated from mercury porosimetry measurement, and/or an intra-particle pore size in a range of from 0.004 to 1.0 μm, preferably in a range of between 0.005 to 0.8 μm, more preferably from 0.006 to 0.6 μm, and most preferably of 0.007 to 0.4 μm, determined from mercury porosity measurement.

According to one embodiment, a surface-reacted calcium carbonate is provided comprising a calcium carbonate-comprising material, preferably calcite, and at least one water-insoluble calcium salt selected from tricalcium phosphate and/or apatitic calcium phosphate, preferably selected from the group consisting of hydroxylapatite, substituted hydroxylapatite, octacalcium phosphate, and mixtures thereof, more preferably selected from the group consisting of hydroxylapatite, fluoroapatite, carboxyapatite, and mixtures thereof, and most preferably hydroxylapatite, wherein the surface-reacted calcium carbonate comprises (i) a specific surface area of from 20 to 200 m$^2$/g measured using nitrogen and the BET method according to ISO 9277:2010; (ii) an intra-particle intruded specific pore volume in the range of from 0.1 to 2.3 cm$^3$/g calculated from mercury porosimetry measurement, and/or an intra-particle pore size in a range of from 0.004 to 1.0 μm, determined from mercury porosity measurement, and (iii) whitlockite in an amount of at least 0.1 wt.-%, based on the total amount of the calcium carbonate and the at least one water-insoluble calcium salt, preferably in an amount of at least at least 0.5 wt.-%, more preferably in an amount of at least 1 wt.-%, and most preferably in an amount of at least 2 wt.-%. According to one embodiment, the mass ratio of calcium carbonate to the at least one water-insoluble calcium salt is in the range of from 1:0.1 to 1:76, preferably in the range from 1:0.2 to 1:10, more preferably from 1:0.5 to 1:6, even more preferably from 1:0.9 to 1:2, and most preferably in a range from 1:0.95 to 1:1.2.

It should be understood that for the purpose of the present invention, the following terms have the following meaning:

The term "acid" as used herein refers to an acid in the meaning of the definition by Brønsted and Lowry (e.g., $H_2SO_4$, $HSO_4^-$), wherein the term "free acid" refers only to those acids being in the fully protonated form (e.g., $H_2SO_4$).

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

A "calcium carbonate-comprising material" in the meaning of the present invention can be a mineral material or a synthetic material having a content of calcium carbonate of at least 50 wt.-%, preferably 75 wt.-%, more preferably 90 wt.-%, and most preferably 95 wt.-%, based on the total weight of the calcium carbonate-comprising material.

Unless specified otherwise, the term "drying" refers to a process according to which at least a portion of water is removed from a material to be dried such that a constant weight of the obtained "dried" material at 200° C. is reached. Moreover, a "dried" or "dry" material may be defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

"Natural ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

The "particle size" of particulate materials other than surface-reacted calcium carbonate herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$ (wt) unless indicated otherwise. Particle sizes were determined by using a Sedigraph™ 5100 or a Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

The "particle size" of surface-reacted calcium carbonate herein is described as volume-based particle size distribution. Volume median particle size $d_{50}$ was evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50 or 98% by volume, respectively, of the particles have a diameter of less than this value. The raw data obtained by the measurement are analysed using the Mie theory, with a particle refractive index of 1.57 and an absorption index of 0.005.

In the context of the present invention, the term "pore" is to be understood as describing the space that is found between and/or within particles, i.e. that is formed by the particles as they pack together under nearest neighbor contact (inter-particle pores), such as in a powder or a compact and/or the void space within porous particles (intra-particle pores), and that allows the passage of liquids under pressure when saturated by the liquid and/or supports absorption of surface wetting liquids.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 3 cm$^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p. 1753-1764.).

The total pore volume seen in the cumulative intrusion data can be separated into two regions with the intrusion data from 214 µm down to about 1-4 µm showing the coarse packing of the sample between any agglomerate structures contributing strongly. Below these diameters lies the fine inter-particle packing of the particles themselves. If they also have intra-particle pores, then this region appears bimodal, and by taking the specific pore volume intruded by mercury into pores finer than the modal turning point, i.e. finer than the bimodal point of inflection, we thus define the specific intra-particle pore volume. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the inter-particle pore region and the intra-particle pore region, if present. Knowing the intra-particle pore diameter range it is possible to subtract the remainder inter-particle and inter-agglomerate pore volume from the total pore volume to deliver the desired pore volume of the internal pores alone in terms of the pore volume per unit mass (specific pore volume). The same principle of subtraction, of course, applies for isolating any of the other pore size regions of interest.

"Precipitated calcium carbonate" (PCC) in the meaning of the present invention is a synthesized material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

A "salt" in the meaning of the present invention is a chemical compound consisting of an assembly of cations and anions (cf. IUPAC, Compendium of Chemical Terminology, 2nd Ed. (the "gold book"), 1997, "salt").

The "specific surface area" (expressed in $m^2/g$) of a material as used throughout the present document can be determined by the Brunauer Emmett Teller (BET) method with nitrogen as adsorbing gas and by use of a ASAP 2460 instrument from Micromeritics. The method is well known to the skilled person and defined in ISO 9277:2010. Samples are conditioned at 100° C. under vacuum for a period of 30 min prior to measurement. The total surface area (in $m^2$) of said material can be obtained by multiplication of the specific surface area (in $m^2/g$) and the mass (in g) of the material.

For the purpose of the present invention, the "solids content" of a liquid composition is a measure of the amount of material remaining after all the solvent or water has been evaporated. If necessary, the "solids content" of a suspension given in wt.-% in the meaning of the present invention can be determined using a Moisture Analyzer HR73 from Mettler-Toledo (T=120° C., automatic switch off 3, standard drying) with a sample size of 5 to 20 g.

The term "surface-reacted" in the meaning of the present application shall be used to indicate that a material has been subjected to a process comprising partial dissolution of said material in aqueous environment followed by a crystallization process on and around the surface of said material, which may occur in the absence or presence of further crystallization additives.

A "suspension" or "slurry" in the meaning of the present invention comprises undissolved solids and water, and optionally further additives, and usually contains large amounts of solids and, thus, is more viscous and can be of higher density than the liquid from which it is formed.

For the purpose of the present invention, the term "viscosity" or "Brookfield viscosity" refers to Brookfield viscosity. The Brookfield viscosity is for this purpose measured by a Brookfield DV-II+ Pro viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

For the purpose of the present application, "water-insoluble" materials are defined as materials which, when 100 g of said material is mixed with 100 g deionised water and filtered on a filter having a 0.2 µm pore size at 20° C. to recover the liquid filtrate, provide less than or equal to 1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 µm pore size at 20° C. to recover the liquid filtrate, provide more than 1 g of recovered solid material following evaporation at 95 to 100° C. of 100 g of said liquid filtrate at ambient pressure.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The inventive process for producing surface-reacted calcium carbonate comprises the steps of a) providing a calcium carbonate-comprising material, b) providing at least one inorganic acid, c) providing at least one water-soluble, inorganic magnesium salt, and d) treating the calcium carbonate-comprising material of step a) with the at least one inorganic acid of step b) and carbon dioxide in an aqueous medium to form an aqueous suspension of surface-reacted calcium carbonate. The carbon dioxide is formed in situ by the inorganic acid treatment and/or is supplied by an external source, and the at least one water-soluble, inorganic magnesium salt of step c) is added before, during and/or after step d).

In the following preferred embodiments of the inventive composition will be set out in more detail. It is to be understood that these embodiments and details also apply to the inventive products and uses.

Process Step a)

According to step a) of the process of the present invention, a calcium-carbonate comprising material is provided.

According to one embodiment the at least one calcium carbonate-comprising material has a content of calcium carbonate of at least 50 wt.-%, preferably 75 wt.-%, more preferably 90 wt.-%, and most preferably 95 wt.-%, based on the total weight of the calcium carbonate-comprising material. According to another embodiment the at least one calcium carbonate comprising material consists of calcium carbonate.

The calcium carbonate-comprising material may be selected from natural ground calcium carbonate and/or precipitated calcium carbonate. According to one embodiment of the present invention, the natural ground calcium carbonate is selected from the group consisting of marble, chalk, limestone, and mixtures thereof, and/or the precipitated calcium carbonate is selected from the group consisting of precipitated calcium carbonates having an aragonitic, vateritic or calcitic crystal form, and mixtures thereof.

"Natural ground calcium carbonate" (GCC) is understood to be manufactured from a naturally occurring form of calcium carbonate, mined from sedimentary rocks such as limestone or chalk, or from metamorphic marble rocks, or produced from eggshells, seashells, or corals. The source of the natural ground calcium carbonate may comprise further naturally occurring components such as magnesium carbonate, alumino silicate etc. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Natural ground calcium carbonate is almost exclusively of the calcitic polymorph, which is said to be trigonal-rhombohedral and represents the most stable form of the calcium carbonate polymorphs.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of natural ground calcium carbonate (GCC) is selected from marble, chalk, limestone, or mixtures thereof, and preferably the source of ground calcium carbonate is marble. According to one embodiment of the present invention the GCC is obtained by dry grinding. According to another embodiment of the present invention the GCC is obtained by wet grinding and subsequent drying.

According to one embodiment of the present invention, the calcium carbonate comprises one type of natural ground calcium carbonate. According to another embodiment of the present invention, the calcium carbonate comprises a mixture of two or more types of natural ground calcium carbonates selected from different sources.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$) and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one inorganic acid by the same means as used for grinding natural ground calcium carbonate as described above.

According to a preferred embodiment, the calcium carbonate-comprising material is ground calcium carbonate.

The calcium carbonate-comprising material may be in form of particles, wherein at least 50 wt.-% of the particles have a diameter of less than 2 µm, preferably at least 70 wt.-% of the particles have a diameter of less than 2 µm, more preferably.

90 wt.-% of the particles have a diameter of less than 2 µm, and most preferably 90 wt.-% of the particles have a diameter of less than 1 µm.

According to one embodiment of the present invention, the calcium carbonate-comprising material is in form of particles having a weight median particle size $d_{50}$ of 0.05 to 10.0 µm, preferably 0.2 to 5.0 µm, more preferably 0.4 to 3.0 µm, and most preferably 0.6 to 1.2 µm.

According to a further embodiment of the present invention, the calcium carbonate-comprising material is in form of particles having a top cut particle size $d_{98}$ of 0.15 to 55 µm, preferably 1 to 30 µm, more preferably 2 to 18 µm, and most preferably 3 to 7 µm.

The calcium carbonate-comprising material may be used dry or in form of an aqueous suspension. According to a preferred embodiment, the calcium carbonate-comprising material is in form of an aqueous suspension having a solids content within the range of 1 wt.-% to 90 wt.-%, preferably 3 wt.-% to 60 wt.-%, more preferably 5 wt.-% to 40 wt.-%, and most preferably 10 wt.-% to 25 wt.-%, based on the total weight of the aqueous suspension.

According to a preferred embodiment of the present invention, the aqueous suspension consists of water and the calcium carbonate-comprising material.

Alternatively, the aqueous suspension of the calcium carbonate-comprising material may comprise further additives, for example, a dispersant. A suitable dispersant may be selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2 000 to 15 000 g/mol, with a weight average molecular weight $M_w$ from 3 000 to 7 000 g/mol or 3 500 to 6 000 g/mol being especially preferred. According to an exemplary embodiment, the dispersant is sodium polyacrylate having a weight average molecular weight $M_w$ from 2 000 to 15 000 g/mol, preferably from 3 000 to 7 000 g/mol, and most preferably from 3 500 to 6 000 g/mol.

According to one embodiment of the present invention, the calcium carbonate-comprising material provided in process step a) is an aqueous suspension of natural ground calcium carbonate and/or precipitated calcium carbonate having a solids content within the range of 1 wt.-% to 90 wt.-%, preferably 3 wt.-% to 60 wt.-%, more preferably 5 wt.-% to 40 wt.-%, and most preferably 10 wt.-% to 25 wt.-%, based on the total weight of the aqueous suspension.
Process Step b)

According to step b) of the process of the present invention, at least one inorganic acid is provided.

The at least one inorganic acid may be any strong inorganic acid, medium-strong, or weak inorganic acid, or a mixture thereof, generating $H_3O^+$ ions under the preparation conditions. According to the present invention, the at least one inorganic acid can also be an acid salt, generating $H_3O^+$ ions under the preparation conditions.

According to one embodiment, the at least one inorganic acid is a strong inorganic acid having a $pK_a$ of 0 or less at 20° C. According to another embodiment, the at least one inorganic acid is a medium-strong inorganic acid having a $pK_a$ value from 0 to 2.5 at 20° C.

If the $pK_a$ at 20° C. is 0 or less, the at least one inorganic acid is preferably selected from sulphuric acid, hydrochloric acid, or mixtures thereof. If the $pK_a$ at 20° C. is from 0 to 2.5, the at least one inorganic acid is preferably selected from sulphurous acid, phosphoric acid, or mixtures thereof. The at least one inorganic acid can also be an inorganic acid salt, for example, $HSO_4^-$ or $H_2PO_4^-$, being at least partially neutralized by a corresponding cation such as $NH_4^+$, $Li^+$, $Na^+$ or $K^+$, or $HPO_4^{2-}$, being at least partially neutralised by a corresponding cation such as $NH_4^+$, $Li^+$, $Na^{+}$ and/or $K^+$. The at least one inorganic acid can also be a mixture of one or more acids and one or more acid salts.

According to one embodiment of the present invention, the at least one inorganic acid is selected from the group consisting of hydrochloric acid, sulphuric acid, sulphurous acid, phosphoric acid, an inorganic acid salt thereof, and mixtures thereof. Preferably the at least one inorganic acid is selected from the group consisting of hydrochloric acid, sulphuric acid, sulphurous acid, phosphoric acid, $H_2PO_4^-$, being at least partially neutralised by a cation selected from $NH_4^+$, $Li^+$, $Na^+$ and/or $K^+$, $HPO_4^{2-}$, being at least partially neutralised by a cation selected from $NH_4^+$, $Li^+$, $Na^{+}$ and/or $K^+$, and mixtures thereof, more preferably the at least one inorganic acid is selected from the group consisting of hydrochloric acid, sulphuric acid, sulphurous acid, phosphoric acid, or mixtures thereof, and most preferably, the at least one inorganic acid is phosphoric acid.

The at least one inorganic acid can be provided in solid form or in form of a solution. According to a preferred embodiment, the at least one inorganic acid is provided in form of a solution.

According to one embodiment the at least one inorganic acid is provided in form of an aqueous solution comprising the at least one inorganic acid in an amount from 0.1 to 100 wt.-%, based on the total weight of the aqueous solution, preferably in an amount from 1 to 80 wt.-%, more preferably in an amount from 10 to 50 wt.-%, and most preferably in an amount from 20 to 40 wt.-%.

According to another embodiment, the at least one inorganic acid is provided in an amount from 1 to 60 wt.-%, based on the total weight of the calcium carbonate-comprising material, preferably from 5 to 55 wt.-%, more preferably from 7 to 50 wt.-%, and most preferably from 10 to 40 wt.-%.
Process Step c)

According to step c) of the process of the present invention at least one water-soluble, inorganic magnesium salt is provided.

The at least one water-soluble, inorganic magnesium salt may be selected from any water-soluble, inorganic magnesium salt known to the skilled person such as, for example, magnesium chloride, magnesium nitrate, magnesium sulfate, magnesium hydrogen sulfate, magnesium bromide, magnesium iodide, magnesium chlorate, or magnesium iodate. The water-soluble, inorganic magnesium salt may be an anhydrous salt or a hydrate salt. As used herein, a "hydrate" is an inorganic salt containing water molecules combined in a definite ratio as an integral part of the crystal. Depending on the number of water molecules per formula unit of salt, the hydrate may be designated as monohydrate, dihydrate, trihydrate, tetrahydrate, pentahydrate, hexahydrate, heptahydrate, octahydrate, nonahydrate, decahydrate, hemihydrates, etc.

According to one embodiment the at least one water-soluble, inorganic magnesium salt is selected from the group consisting of magnesium chloride, magnesium nitrate, magnesium sulfate, magnesium hydrogen sulfate, magnesium bromide, magnesium iodide, magnesium chlorate, magnesium iodate, hydrates thereof, and mixtures thereof, preferably the at least one water-soluble, inorganic magnesium salt is selected from the group consisting of magnesium bromide, magnesium nitrate, magnesium sulfate, hydrates thereof, and mixtures thereof, and most preferably the at least on water-soluble, inorganic magnesium salt is magnesium sulfate or a hydrate thereof.

According to one embodiment magnesium chloride is selected from anhydrous magnesium chloride, and/or magnesium chloride hexahydrate ($MgCl_2 \cdot 6H_2O$).

According to one embodiment magnesium nitrate is selected from anhydrous magnesium nitrate, magnesium nitrate dihydrate (Mg(NO$_3$)$_2$·2H$_2$O), magnesium nitrate hexahydrate (Mg(NO$_3$)$_2$·6H$_2$O), or mixtures thereof.

According to one embodiment magnesium sulfate is selected from anhydrous magnesium sulfate, magnesium sulfate monohydrate (MgSO$_4$·H$_2$O), magnesium sulfate tetrahydrate (MgSO$_4$·4H$_2$O), magnesium sulfate pentahydrate (MgSO$_4$·5H$_2$O), magnesium sulfate hexahydrate (MgSO$_4$·6H$_2$O), magnesium sulfate heptahydrate (MgSO$_4$·7H$_2$O), or mixtures thereof.

According to one embodiment magnesium bromide is selected from anhydrous magnesium bromide, and/or magnesium bromide hexahydrate (MgBr$_2$·6H$_2$O).

According to one embodiment magnesium iodide is selected from anhydrous magnesium iodide, magnesium iodide hexahydrate (MgI$_2$·6H$_2$O), magnesium iodide octahydrate (MgI$_2$·8H$_2$O), or mixtures thereof.

According to one embodiment magnesium chlorate is selected from anhydrous magnesium chlorate, and/or magnesium chlorate hexahydrate (Mg(ClO$_3$)$_2$·6H$_2$O).

According to one embodiment magnesium iodate is selected from anhydrous magnesium iodate, and/or magnesium iodate tetrahydrate (Mg(IO$_3$)$_2$·4H$_2$O).

According to one embodiment the at least one water-soluble, inorganic magnesium salt is selected from the group consisting of anhydrous magnesium chloride, magnesium chloride hexahydrate, anhydrous magnesium nitrate, magnesium nitrate dihydrate, magnesium nitrate hexahydrate, anhydrous magnesium sulfate, magnesium sulfate monohydrate, magnesium sulfate tetrahydrate, magnesium sulfate pentahydrate, magnesium sulfate hexahydrate, magnesium sulfate heptahydrate, magnesium hydrogen sulfate, anhydrous magnesium bromide, magnesium bromide hexahydrate, anhydrous magnesium iodide, magnesium iodide hexahydrate, magnesium iodide octahydrate, anhydrous magnesium chlorate, magnesium chlorate hexahydrate, anhydrous magnesium iodate, magnesium iodate tetrahydrate, and mixtures thereof, preferably the at least one water-soluble, inorganic magnesium salt is selected from the group consisting of anhydrous magnesium chloride, magnesium chloride hexahydrate, anhydrous magnesium nitrate, magnesium nitrate dihydrate, magnesium nitrate hexahydrate, anhydrous magnesium sulfate, magnesium sulfate monohydrate, magnesium sulfate tetrahydrate, magnesium sulfate pentahydrate, magnesium sulfate hexahydrate, magnesium sulfate heptahydrate, and mixtures thereof, more preferably the at least one water-soluble, inorganic magnesium salt is anhydrous magnesium nitrate, magnesium nitrate dihydrate, magnesium nitrate hexahydrate, anhydrous magnesium sulfate, magnesium sulfate monohydrate, magnesium sulfate tetrahydrate, magnesium sulfate pentahydrate, magnesium sulfate hexahydrate, magnesium sulfate heptahydrate, and mixtures thereof, and most preferably the at least one water-soluble, inorganic magnesium salt is anhydrous magnesium sulfate, magnesium sulfate monohydrate, magnesium sulfate tetrahydrate, magnesium sulfate pentahydrate, magnesium sulfate hexahydrate, magnesium sulfate heptahydrate, or a mixture thereof.

According to one embodiment the at least one water-soluble, inorganic magnesium salt is provided in an amount from 0.3 to 270 mmol Mg$^{2+}$/mol Ca$^{2+}$ of the calcium carbonate-comprising material, preferably from 0.7 to 200 mmol Mg$^{2+}$/mol Ca$^{2+}$ of the calcium carbonate-comprising material, more preferably from 2 to 135 mmol Mg$^{2+}$/mol Ca$^{2+}$ of the calcium carbonate-comprising material, and most preferably from 3 to 70 mmol Mg$^{2+}$/mol Ca$^{2+}$ of the calcium carbonate-comprising material.

According to one embodiment the at least one water-soluble, inorganic magnesium salt is provided in an amount so that the amount of Mg$^{2+}$ in said magnesium salt is from 0.05 to 20 wt.-%, based on the total weight of the calcium carbonate-comprising material, preferably from 0.1 to 15 wt.-%, more preferably from 0.3 to 10 wt.-%, and most preferably from 0.4 to 5 wt.-%.

According to another embodiment the at least one water-soluble, inorganic magnesium salt is provided in an amount from 0.05 to 40 wt.-%, based on the total weight of the calcium carbonate-comprising material, preferably from 0.1 to 30 wt.-%, more preferably from 0.3 to 20 wt.-%, and most preferably from 0.5 to 10 wt.-%.

The at least one water-soluble, inorganic magnesium salt can be provided in form of a solution or as a dry material.

According to one embodiment the at least one water-soluble, inorganic magnesium salt is provided as dry material. The dry material may be in the form of powder, flakes, granules etc. and most preferably is in the form of a powder.

According to another embodiment the at least one water-soluble, inorganic magnesium salt is provided in form of an aqueous solution, preferably an aqueous solution comprising the at least one water-soluble, inorganic magnesium salt in an amount from 0.01 to 10 wt.-%, based on the total weight of the aqueous solution, preferably in an amount from 0.1 to 8 wt.-%, more preferably in an amount from 0.4 to 5 wt.-%, and most preferably in an amount from 0.8 to 2 wt.-%.

Process Step d)

According to step d) of the process of the present invention, the calcium carbonate-comprising material of step a) is treated with the at least one inorganic acid of step b) and carbon dioxide in an aqueous medium to form a suspension of surface-reacted calcium carbonate, wherein the carbon dioxide is formed in-situ by the inorganic acid treatment and/or is supplied from an external source, and wherein the at least one water-soluble, inorganic magnesium salt of step c) is added before, during and/or after step d).

The calcium carbonate-comprising material can be treated with the at least one inorganic acid by providing an aqueous suspension of the calcium carbonate-comprising material and adding the at least one inorganic acid to said suspension. The at least one inorganic acid can be added to the suspension as a concentrated solution or a more diluted solution.

According to one embodiment, the at least one water-soluble, inorganic magnesium salt of step c) is added before step d). In other words, the at least one water-soluble, inorganic magnesium salt may be provided in a first step, and subsequently, step d) may be carried out by adding the calcium carbonate-comprising material of step a) and the at least one inorganic acid of step b) to the water-soluble, inorganic magnesium salt. The calcium carbonate-comprising material of step a) and the at least one inorganic acid of step b) may be added in any order or simultaneously.

Additionally, or alternatively, the at least one water-soluble, inorganic magnesium salt of step c) is added during step d). According to one embodiment, the calcium carbonate-comprising material of step a) is provided in a first step, the water-soluble, inorganic magnesium salt of step c) is added in a second step, and the at least one inorganic acid of step b) is added in a third step. According to another embodiment, the at least one inorganic acid of step b) is provided in a first step, the water-soluble, inorganic magnesium salt of step c) is added in a second step, and the calcium carbonate-comprising material of step a) is added in a third step. According to still another embodiment, the calcium carbonate-comprising material of step a) and the water-soluble, inorganic magnesium salt of step c) are provided in a first step, and the at least one inorganic acid of step b) is added in a second step. According to still another embodiment, the at least one inorganic acid of step b) and the water-soluble, inorganic magnesium salt of step c) are provided in a first step, and the calcium carbonate-comprising material of step a) is added in a second step. According to still another embodiment, the calcium carbonate-comprising material of step a), the at least one inorganic acid of step b), and the water-soluble, inorganic magnesium salt of step c) are added simultaneously.

The at least one inorganic acid of step b) and the at least one water-soluble, inorganic magnesium salt of step c) may be provided in form of separate solutions and/or in form of combined solutions.

According to one embodiment, in step d) the calcium carbonate-comprising material is treated with a solution comprising the at least one inorganic acid of step b) and the at least one water-soluble, inorganic magnesium salt of step c). According to another embodiment, the at least one water-soluble, inorganic magnesium salt of step c) is added during step d) and in step d) the calcium carbonate-comprising material is treated with a solution comprising the at least one inorganic acid of step b) and the at least one water-soluble, inorganic magnesium salt of step c).

According to another embodiment, in step d) the calcium carbonate-comprising material is treated with a first solution comprising a first part of the at least one inorganic acid of step b), and subsequently, with a second solution comprising the remaining part of the at least one inorganic acid of step b) and the at least one water-soluble, inorganic magnesium salt of step c). The first solution may comprise less than or equal to 50 wt.-% of the at least one inorganic acid, based on the total amount of the at least one inorganic acid, preferably less than or equal to 40 wt.-%, more preferably less than or equal to 30 wt.-%, and most preferably less than or equal to 20 wt.-%. For example, the first solution may comprise from 0.1 to 50 wt.-% of the at least one inorganic acid, based on the total amount of the at least one inorganic acid, preferably from 1 to 40 wt.-%, more preferably from 5 to 30 wt.-%, and most preferably from 10 to 20 wt.-%.

According to still another embodiment, in step b) a first inorganic acid and a second inorganic acid are provided, and in step d) the calcium carbonate-comprising material is treated with a first solution comprising the first inorganic acid, and subsequently, with a second solution comprising the second inorganic acid and the at least one water-soluble, inorganic magnesium salt of step c).

According to one embodiment in step d) the calcium carbonate-comprising material is treated with a first solution comprising a first part of the at least one inorganic acid of step b), and subsequently, with a second solution comprising the remaining part of the at least one inorganic acid of step b) and the at least one water-soluble, inorganic magnesium salt of step c), wherein the first solution comprises less than 50 wt.-% of the at least one inorganic acid, based on the total amount of the at least one inorganic acid, preferably less than 40 wt.-%, more preferably less than 30 wt.-%, and most preferably less than 20 wt.-%.

Additionally, or alternatively, the at least one water-soluble, inorganic magnesium salt of step c) is added after step d). In other words, the calcium carbonate-comprising material of step a) and the at least one inorganic acid of step b) may be contacted in a first step, and subsequently, the water-soluble, inorganic magnesium salt may be added. The calcium carbonate-comprising material of step a) and the at least one inorganic acid of step b) may be contacted in any order or simultaneously.

According to a preferred embodiment in step d) the calcium carbonate-comprising material is treated with a solution comprising the at least one inorganic acid in an amount from 1 to 80 wt.-%, preferably in an amount from 2 to 50 wt.-%, more preferably in an amount from 5 to 40 wt.-%, and most preferably in an amount from 10 to 30 wt.-%, based on the total weight of the aqueous solution, and the at least one water-soluble, inorganic magnesium salt in an amount from 0.01 to 40 wt.-%, preferably in an amount from 0.1 to 30 wt.-%, more preferably in an amount from 0.4 to 20 wt.-%, and most preferably in an amount from 0.8 to 15 wt.-%, based on the total weight of the aqueous solution.

According to a preferred embodiment, the calcium carbonate-comprising material is a natural ground calcium carbonate, the at least one inorganic acid is phosphoric acid, the at least one water-soluble, inorganic magnesium salt is selected from the group consisting of magnesium bromide, magnesium nitrate, magnesium sulfate, hydrates thereof, and mixtures thereof, wherein the at least one water-soluble, inorganic magnesium salt of step c) is added during step d) and the calcium carbonate-comprising material is treated with a solution comprising the at least one inorganic acid of step b) and the at least one water-soluble, inorganic magnesium salt of step c).

According to a preferred embodiment, the calcium carbonate-comprising material is a natural ground calcium carbonate, the at least one inorganic acid is phosphoric acid, the at least one water-soluble, inorganic magnesium salt is selected from the group consisting of magnesium bromide, magnesium nitrate, magnesium sulfate, hydrates thereof, and mixtures thereof, wherein the at least one water-soluble, inorganic magnesium salt of step c) is added during step d), and the calcium carbonate-comprising material is treated with a first solution comprising a first part of the at least one inorganic acid of step b), and subsequently, with a second solution comprising the remaining part of the at least one inorganic acid of step b) and the at least one water-soluble, inorganic magnesium salt of step c).

According to one embodiment, the at least one inorganic acid is added over a time period of at least 1 min, preferably at least 5 min, and more preferably at least 10 min. In case the calcium carbonate-comprising material is treated with a solution comprising the at least one inorganic acid of step b) and the at least one water-soluble, inorganic magnesium salt of step c), said solution may be added over a time period of at least 1 min, preferably at least 5 min, and more preferably at least 10 min. In case the calcium carbonate-comprising material is treated with a first and a second solution, the first solution comprising a first part of the at least one inorganic acid or a first inorganic acid may be added over a time period of at least 1 min, preferably at least 5 min, and more preferably at least 10 min, and the second solution comprising the remaining part of the at least one inorganic acid or the second inorganic acid and the at least one water-soluble, inorganic magnesium salt may be added over a time period of at least 1 min, preferably at least 5 min, and more preferably at least 10 min.

According to step d) of the process of the present invention, the calcium carbonate-comprising material is treated with carbon dioxide. Depending on the type of inorganic acid and its concentration, the carbon dioxide may be formed automatically during the inorganic acid treatment of the calcium carbonate-comprising material. Alternatively or additionally, the carbon dioxide can be supplied from an external source.

Inorganic acid treatment and treatment with carbon dioxide can be carried out simultaneously which is the case when a strong or medium-strong acid is used. It is also possible to carry out the inorganic acid treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the inorganic acid treatment, followed by the additional treatment with carbon dioxide supplied from an external source.

According to a preferred embodiment, the carbon dioxide is formed in situ by the inorganic acid treatment.

Preferably, the concentration of gaseous carbon dioxide in the suspension formed in step d) is, in terms of volume, such that the ratio (volume of suspension):(volume of gaseous $CO_2$) is from 1:0.05 to 1:70, preferably from 1:0.05 to 1:60, and more preferably from 1:0.05 to 1:40; and most preferably from 1:0.05 to 1:30.

In a preferred embodiment, the inorganic acid treatment step and/or the carbon dioxide treatment of step d) are repeated at least once, more preferably several times.

Subsequent to the inorganic acid treatment and carbon dioxide treatment, the pH of the aqueous suspension, measured at 20° C., naturally reaches a value of greater than 6.0, preferably greater than 6.5, more preferably greater than 7.0, thereby preparing the surface-reacted natural or precipitated calcium carbonate as an aqueous suspension having a pH of greater than 6.0, preferably greater than 6.5, more preferably greater than 7.0.

According to one embodiment of the present invention, step d) is carried out at a temperature from 20 to 90° C., preferably from 30 to 85° C., more preferably from 40 to 80° C., even more preferably from 50 to 75° C., and most preferably from 60 to 70° C.

According to one embodiment, the process step d) is carried out for at least 1 min, preferably for at least 5 min, more preferably for at least 10 min, and most preferably for at least 15 min.

Process step d) may be carried out by simply adding, for example, by pouring, discharging, or injecting, the at least one inorganic acid and/or the at least one water-soluble, inorganic magnesium salt into the calcium carbonate-comprising material. According to one embodiment, process step d) is carried out under mixing conditions. Suitable mixing methods are known to the skilled person. Examples of suitable mixing methods are shaking, mixing, stirring, agitating, ultrasonication, or inducing a turbulent or laminar flow by means such as baffles or lamellae. Suitable mixing equipment is known to the skilled person, and may be selected, for example, from stirrers, such as rotor stator systems, blade stirrers, propeller stirrers, turbine stirrers, or anchor stirrers, static mixers such as pipes including baffles or lamellae. According to an exemplary embodiment of the present invention, a rotor stator stirrer system is used.

According to another exemplary embodiment, in step d) the formed suspension is mixed so as to develop an essentially laminar flow. The skilled person will adapt the mixing conditions such as the mixing speed and temperature according to his process equipment.

Depending on the amount of water that is introduced during step d) by contacting the aforementioned compounds, additional water may be introduced during process step d), for example, in order to control and/or maintain and/or achieve the desired solids content or Brookfield viscosity of the obtained aqueous suspension. According to one embodiment the solids content of the mixture obtained in step d) is from 1 to 40 wt.-%, preferably from 5 to 30 wt.-%, more preferably from 8 to 25 wt.-%, and most preferably from 10 to 20 wt.-%, based on the total weight of the mixture. The Brookfield viscosity of the obtained aqueous suspension may be from 10 to 10 000 mPa·s, preferably from 50 to 1 000 mPa·s.

The process of the present invention may be carried out in form of a continuous process or a batch process, preferably in from of a batch process. Process step d) may repeated once or several times, if appropriate.

According to one embodiment, the aqueous phase of the obtained surface-reacted calcium carbonate slurry may be replaced with deionized water.

The inventors of the present invention have surprisingly found that by the inventive process it is possible to increase the specific BET surface area of surface-reacted calcium carbonate in a predetermined way, for example, by a particular percentage compared to the calcium carbonate comprising source material. The addition of the at least one water-soluble, inorganic magnesium salt before, during and/or after step d) of the inventive process may lead to surface-reacted calcium carbonate particles having an increased specific BET surface area. Furthermore, it was found that the particle size of the obtained surface-reacted calcium carbonate is not affected significantly by the addition of the at least one water-soluble, inorganic magnesium salt. Thus, the process of the present invention may provide the possibility of selectively increasing the specific BET surface area of surface-reacted calcium carbonate independently of the particle size distribution. It was also found by the inventors that the porosity of the calcium carbonate can be controlled and shifted to higher or lower values. Hence, the present invention provides the possibility to tailor the physical properties of surface-reacted calcium carbonate for specific applications. Moreover, it was found that the exclusive use of inorganic materials in the process of the present invention avoids or at least significantly inhibits growth of microorganisms in slurries of the obtained surface-reacted calcium carbonate.

According to one embodiment, the inventive process leads to a surface-reacted reacted calcium carbonate having a specific surface area (BET) that is at least 15%, preferably at least 40% greater, more preferably at least 60% greater, even more preferably at least 100% greater, and most preferably at least 120% greater than the specific surface area (BET) of surface-reacted calcium carbonate obtained by treating the calcium carbonate-comprising material provided in step a) with the at least one inorganic acid only, measured using nitrogen and the BET method. For example, the inventive process may lead to a surface-reacted reacted calcium carbonate having a specific surface area (BET) that is between 15 and 39% greater, preferably between 40 and 59% greater, more preferably between 60 and 99% greater, and most preferably between 100 and 120% greater than the specific surface area (BET) of surface-reacted calcium carbonate obtained by treating the calcium carbonate-comprising material provided in step a) with the at least one inorganic acid only, measured using nitrogen and the BET method.

The surface-reacted calcium carbonate may have an intra-particle intruded specific pore volume in the range from 0.1 to 2.3 $cm^3/g$, preferably from 0.2 to 2.0 $cm^3/g$, more preferably from 0.4 to 1.8 $cm^3/g$ and most preferably from 0.6 to 1.6 $cm^3/g$, calculated from mercury porosimetry measurement.

The intra-particle pore size of the surface-reacted calcium carbonate preferably is in a range of from 0.004 to 1.0 μm, more preferably in a range of between 0.005 to 0.8 μm, especially preferably from 0.006 to 0.6 µm and most preferably of 0.007 to 0.4 µm, determined by mercury porosimetry measurement.

According to one embodiment of the present invention, the calcium carbonate-comprising material is a natural ground calcium carbonate, the at least one inorganic acid is phosphoric acid, the at least one water-soluble, inorganic magnesium salt is selected from the group consisting of magnesium bromide, magnesium nitrate, magnesium sulfate, hydrates thereof, and mixtures thereof, and preferably is magnesium sulfate or a hydrate thereof, and in step d) the calcium carbonate-comprising material is treated with a solution comprising the at least one inorganic acid of step b) and the at least one water-soluble, inorganic magnesium salt of step c). Preferably, the carbon dioxide is formed in situ by the inorganic acid treatment and/or step d) is carried out at a temperature from 20 to 90° C., preferably from 30 to 85° C., more preferably from 40 to 80° C., even more preferably from 50 to 75° C., and most preferably from 60 to 70° C. In addition, the at least one inorganic acid may be provided in an amount from 1 to 60 wt.-%, based on the total weight of the calcium carbonate-comprising material, preferably from 5 to 55 wt.-%, more preferably from 7 to 50 wt.-%, and most preferably from 10 to 40 wt.-%, and/or the the at least one water-soluble, inorganic magnesium salt may be provided in an amount from 0.3 to 270 mmol $Mg^{2+}$/mol $Ca^{2+}$ of the calcium carbonate-comprising material, preferably from 0.7 to 200 mmol $Mg^{2+}$/mol $Ca^{2+}$ of the calcium carbonate-comprising material, more preferably from 2 to 135 mmol $Mg^{2+}$/mol $Ca^{2+}$ of the calcium carbonate-comprising material, and most preferably from 3 to 70 mmol $Mg^{2+}$/mol $Ca^{2+}$ of the calcium carbonate-comprising material.

Additional Process Steps

According to one embodiment, the process of the present invention further comprises a step of agitating the aqueous suspension after step d). Preferably, the suspension is agitated for at least 1 min, preferably for at least 5 min, more preferably for at least 10 min, and most preferably for at least 15 min.

The aqueous suspension of surface-reacted calcium carbonate may be further processed, e.g., the surface-reacted calcium carbonate may be separated from the aqueous suspension and/or subjected to a drying step.

According to one embodiment, the process of the present invention further comprises a step e) of separating the surface-reacted calcium carbonate from the aqueous suspension obtained in step d). Thus, a process for manufacturing a surface-reacted calcium carbonate may comprise the following steps:
a) providing a calcium carbonate-comprising material,
b) providing at least one inorganic acid,
c) providing at least one water-soluble, inorganic magnesium salt, and
d) treating the calcium carbonate-comprising material of step a) with the at least one inorganic acid of step b) and carbon dioxide in an aqueous medium to form an aqueous suspension of surface-reacted calcium carbonate,
wherein the carbon dioxide is formed in-situ by the inorganic acid treatment and/or is supplied from an external source, and
wherein the at least one water-soluble, inorganic magnesium salt of step c) is added before, during and/or after step d), and
e) separating the surface-reacted calcium carbonate from the aqueous suspension obtained from step d).

The surface-reacted calcium carbonate obtained from step d) may be separated from the aqueous suspension by any conventional means of separation known to the skilled person. According to one embodiment of the present invention, in process step e) the surface-reacted calcium carbonate is separated mechanically and/or thermally. Examples of mechanical separation processes are filtration, e.g. by means of a drum filter or filter press, nanofiltration, or centrifugation. An example for a thermal separation process is a concentrating process by the application of heat, for example, in an evaporator. According to a preferred embodiment, in process step e) the surface-reacted calcium carbonate is separated mechanically, preferably by filtration and/or centrifugation.

After separation, the surface-reacted calcium carbonate can be dried in order to obtain a dried surface-reacted calcium carbonate. According to one embodiment, the process of the present invention further comprises a step f) of drying the surface-reacted calcium carbonate after step d) or after step e), if present, at a temperature in the range from 60 to 600° C., preferably until the moisture content of the surface-reacted calcium carbonate is between 0.01 and 5 wt.-%, based on the total weight of the dried surface-reacted calcium carbonate.

According to one embodiment of the present invention, a process for manufacturing a dried surface-reacted calcium carbonate is provided comprising the following steps:
a) providing a calcium carbonate-comprising material,
b) providing at least one inorganic acid,
c) providing at least one water-soluble, inorganic magnesium salt, and
d) treating the calcium carbonate-comprising material of step a) with the at least one inorganic acid of step b) and carbon dioxide in an aqueous medium to form an aqueous suspension of surface-reacted calcium carbonate,
wherein the carbon dioxide is formed in-situ by the inorganic acid treatment and/or is supplied from an external source, and
wherein the at least one water-soluble, inorganic magnesium salt of step c) is added before, during and/or after step d),
e) separating the surface-reacted calcium carbonate from the aqueous suspension obtained from step d), and
f) drying the surface-reacted calcium carbonate.

In general, the drying step f) may take place using any suitable drying equipment and can, for example, include thermal drying and/or drying at reduced pressure using equipment such as an evaporator, a flash drier, an oven, a spray drier and/or drying in a vacuum chamber. The drying step f) can be carried out at reduced pressure, ambient pressure or under increased pressure. For temperatures below 100° C. it may be preferred to carry out the drying step under reduced pressure.

According to one preferred embodiment, the separation is carried out by a thermal method. This may allow to dry the surface-reacted calcium carbonate subsequently without changing the equipment.

According to one embodiment, in process step f) the surface-reacted calcium carbonate is dried until the moisture content of the formed surface-reacted calcium carbonate is less than or equal to 1.0 wt.-%, based on the total weight of the dried surface-reacted calcium carbonate, preferably less than or equal to 0.5 wt.-%, and more preferably less than or equal to 0.2 wt.-%. According to another embodiment, in process step d) the surface-reacted calcium carbonate is dried until the moisture content of the formed surface-reacted calcium carbonate is between 0.01 and 0.15 wt.-%, preferably between 0.02 and 0.10 wt.-%, and more preferably between 0.03 and 0.07 wt.-%, based on the total weight of the dried surface-reacted calcium carbonate.

According to one embodiment of the present invention, the process further comprises a step g) of treating the surface-reacted calcium carbonate particles obtained in step d), e) or f) with at least one hydrophobizing agent, preferably an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester, to obtain surface-reacted calcium carbonate comprising on at least a part of the accessible surface area a treatment layer comprising the hydrophobizing agent.

It is to be noted that step g) is independent from steps e) and/or f).

The hydrophobizing agent used in treatment step g) may be any agent known to the skilled person which is capable to form a hydrophobic treatment layer on at least a part of the accessible surface area of the surface-reacted calcium carbonate.

The process step g) of treating the surface-reacted calcium carbonate obtained in step d), e) or f) with at least one mono-substituted succinic anhydride and/or with at least one phosphoric acid ester blend and suitable compounds for coating are described in EP 2 722 368 A1 and EP 2 770 017 A1, which are thus incorporated herewith by references.

Suitable aliphatic carboxylic acids for treating the surface-reacted calcium carbonate particles obtained in step d), e) or f) are for example aliphatic linear or branched carboxylic acids having between 4 and 24 carbon atoms and are described in EP 3 042 878 A1.

According to one embodiment, the process of the present invention does not comprise the step of adding a compound selected from the group consisting of aluminium silicate, synthetic silica, calcium silicate, silicate of a monovalent salt, sodium aluminate, potassium aluminate, or mixtures thereof. In addition or alternatively, the process of the present invention may not comprise the step of adding a compound selected from the group consisting of talc, kaolin, titanium dioxide, magnesium oxide, or mixtures thereof.

The Surface-Reacted Calcium Carbonate

According to a further aspect of the present invention, a surface-reacted calcium carbonate is provided, wherein the surface-reacted calcium carbonate is obtainable by a process of the present invention. Thus, the surface-reacted calcium carbonate may be obtained by a process comprising the steps of:

a) providing a calcium carbonate-comprising material,
b) providing at least one inorganic acid,
c) providing at least one water-soluble, inorganic magnesium salt, and
d) treating the calcium carbonate-comprising material of step a) with the at least one inorganic acid of step b) and carbon dioxide in an aqueous medium to form an aqueous suspension of surface-reacted calcium carbonate, wherein the carbon dioxide is formed in-situ by the inorganic acid treatment and/or is supplied from an external source, and
wherein the at least one water-soluble, inorganic magnesium salt of step c) is added before, during and/or after step d).

The surface-reacted calcium carbonate may have different particle shapes, such as e.g. the shape of roses, golf balls and/or brains.

According to one embodiment the surface-reacted calcium carbonate has a specific surface area of from 20 $m^2/g$ to 200 $m^2/g$, preferably from 30 $m^2/g$ to 180 $m^2/g$, more preferably from 35 $m^2/g$ to 150 $m^2/g$, even more preferably from 40 $m^2/g$ to 130 $m^2/g$, most preferably from 50 $m^2/g$ to 100 $m^2/g$, measured using nitrogen and the BET method. The BET specific surface area in the meaning of the present invention is defined as the surface area of the particles divided by the mass of the particles. As used therein the specific surface area is measured by adsorption using the BET isotherm (ISO 9277:2010) and is specified in $m^2/g$.

According to one embodiment, the surface-reacted calcium carbonate has a volume determined median particle size $d_{50}$ (vol) from 1 to 75 µm, preferably from 2 to 50 µm, more preferably from 2 to 40 µm, even more preferably from 2.5 to 30 µm, and most preferably from 3 to 15 µm, and/or a volume determined top cut particle size $d_{98}$ (vol) from 2 to 150 µm, preferably from 4 to 100 µm, more preferably from 4 to 80 µm, even more preferably from 5 to 60 µm, and most preferably from 7 to 30 µm.

The surface-reacted calcium carbonate may have an intra-particle intruded specific pore volume in the range from 0.1 to 2.3 $cm^3/g$, preferably from 0.2 to 2.0 $cm^3/g$, more preferably from 0.3 to 1.8 $cm^3/g$ and most preferably from 0.35 to 1.6 $cm^3/g$, calculated from mercury porosimetry measurement.

The intra-particle pore size of the surface-reacted calcium carbonate preferably is in a range of from 0.004 to 1.0 µm, more preferably in a range of between 0.005 to 0.8 µm, especially preferably from 0.006 to 0.6 µm and most preferably of 0.007 to 0.4 µm, determined by mercury porosimetry measurement.

According to one embodiment, a surface-reacted calcium carbonate is provided, wherein the surface-reacted calcium carbonate comprises a calcium carbonate-comprising material, at least one water-insoluble calcium salt other than calcium carbonate, and at least one water-insoluble magnesium salt.

According to one embodiment, surface-reacted calcium carbonate is provided, wherein the surface-reacted calcium carbonate comprises a calcium carbonate-comprising material, and at least one water-insoluble calcium salt other than calcium carbonate, for example, tricalcium phosphate and/or apatitic calcium phosphate, preferably hydroxylapatite, octacalcium phosphate, fluroroapatite, carboxyapatite, or mixtures thereof. The surface-reacted calcium carbonate may comprise a mass ratio of calcium carbonate to tricalcium phosphate and/or apatitic calcium phosphate, which is in the range from 0.01:1 to 59:1, preferably from 0.1:1 to 44:1, more preferably from 0.2:1 to 29:1, even more preferably from 0.3:1 to 15:1, and most preferably from 0.5:1 to 5:1.

According to one embodiment the surface-reacted calcium carbonate comprises a calcium carbonate-comprising material, and at least one water-insoluble calcium salt selected from tricalcium phosphate and/or apatitic calcium phosphate, preferably selected from the group consisting of hydroxylapatite, substituted hydroxylapatite, octacalcium phosphate, and mixtures thereof. Hydroxylapatite may be present in unsubstituted or substituted form. Examples of substituted hydroxylapatite are fluroroapatite or carboxyapatite. According to one embodiment, the water-insoluble calcium salt is selected from the group consisting of hydroxylapatite, fluroroapatite, carboxyapatite, and mixtures thereof, and most preferably hydroxylapatite, According to one embodiment the calcium carbonate-comprising material is calcite. The surface-reacted calcium carbonate may comprise a mass ratio of calcium carbonate to the water-insoluble calcium salt, in the range from 1:0.1 to 1:76, preferably in the range from 1:0.2 to 1:10, more preferably from 1:0.5 to 1:6, even more preferably from 1:0.9 to 1:2, and most preferably in a range from 1:0.95 to 1:1.2. According to a preferred embodiment, the calcium carbonate-comprising material is calcite, the at least one water-insoluble calcium salt is hydroxylapatite, and the mass ratio of calcite to hydroxylapatite is in the range from 1:0.1 to 1:76, preferably in the range from 1:0.2 to 1:10, more preferably from 1:0.5 to 1:6, even more preferably from 1:0.9 to 1:2, and most preferably in a range from 1:0.95 to 1:1.2.

The skilled person will appreciate that the mass ratio of calcium carbonate to water-insoluble calcium salt can be controlled by the added amount of the at least one inorganic acid. For example, providing phosphoric acid in an amount of 5 wt.-%, based on the total weight of calcium carbonate-comprising material, may result in a mass ratio of calcium carbonate to hydroxylapatite of about 1:0.1. According to one exemplary embodiment, the calcium carbonate-comprising material is a natural ground calcium carbonate and/or a precipitated calcium carbonate, the at least one inorganic acid is phosphoric acid and provided in an amount of 10 wt.-%, based on the total weight of the calcium carbonate-comprising material, the at least one water-insoluble calcium salt is hydroxylapatite, and the mass ratio of calcium carbonate to hydroxylapatite is in the range from 1:0.18 to 1:0.22. According to another exemplary embodiment, the calcium carbonate-comprising material is a natural ground calcium carbonate and/or a precipitated calcium carbonate, the at least one inorganic acid is phosphoric acid and provided in an amount of 20 wt.-%, based on the total weight of the calcium carbonate-comprising material, the at least one water-insoluble calcium salt is hydroxylapatite, and the mass ratio of calcium carbonate to hydroxylapatite is in the range from 1:0.48 to 1:0.54. According to still another exemplary embodiment, the calcium carbonate-comprising material is a natural ground calcium carbonate and/or a precipitated calcium carbonate, the at least one inorganic acid is phosphoric acid and provided in an amount of 30 wt.-%, based on the total weight of the calcium carbonate-comprising material, the at least one water-insoluble calcium salt is hydroxylapatite, and the mass ratio of calcium carbonate to hydroxylapatite is in the range from 1:0.95 to 1:1.05. According to still another exemplary embodiment, the calcium carbonate-comprising material is a natural ground calcium carbonate and/or a precipitated calcium carbonate, the at least one inorganic acid is phosphoric acid and provided in an amount of 50 wt.-%, based on the total weight of the calcium carbonate-comprising material, the at least one water-insoluble calcium salt is hydroxylapatite, and the mass ratio of calcium carbonate to hydroxylapatite is in the range from 1:5 to 1:6.

It was surprisingly found by the inventors of the present invention that the amount of crystalline water-insoluble calcium salt in the inventive surface-reacted calcium carbonate may be increased compared to that of conventionally produced surface-reacted calcium carbonate. For example, it was found that surface-reacted calcium carbonates produced from phosphoric acid may contain more crystalline tricalcium phosphate and/or apatitic calcium phosphate than conventionally produced surface-reacted calcium carbonate. Without being bound to any theory, the inventors believe that the addition of at least one water-soluble, inorganic magnesium salt promotes the crystallization of calcium phosphates such as hydroxylapatite, leaving less amorphous calcium phosphates remaining.

According to one embodiment of the present invention, the surface-reacted calcium carbonate has a specific surface area (BET) of from 20 $m^2/g$ to 200 $m^2/g$, preferably from 30 $m^2/g$ to 180 $m^2/g$, more preferably from 35 $m^2/g$ to 150 $m^2/g$, even more preferably from 40 $m^2/g$ to 130 $m^2/g$, and most preferably from 50 $m^2/g$ to 100 $m^2/g$, measured using nitrogen and the BET method, and the surface-reacted calcium salt particles comprise a mass ratio of calcium carbonate to apatitic calcium phosphate, preferably hydroxylapatite, octacalcium phosphate, fluroroapatite, carboxyapatite, or mixtures thereof, more preferably hydroxylapatite, in the range from 0.01:1 to 59:1, preferably from 0.1:1 to 44:1, more preferably from 0.2:1 to 29:1, even more preferably from 0.3:1 to 15:1, and most preferably from 0.5:1 to 5:1.

According to another embodiment of the present invention, the surface-reacted calcium carbonate has a specific surface area (BET) of from 20 $m^2/g$ to 200 $m^2/g$, preferably from 30 $m^2/g$ to 180 $m^2/g$, more preferably from 35 $m^2/g$ to 150 $m^2/g$, even more preferably from 40 $m^2/g$ to 130 $m^2/g$, and most preferably from 50 $m^2/g$ to 100 $m^2/g$, measured using nitrogen and the BET method, and the surface-reacted calcium salt particles comprise a mass ratio of calcium carbonate to apatitic calcium phosphate, preferably selected from the group consisting of hydroxylapatite, substituted hydroxylapatite, octacalcium phosphate, and mixtures thereof, more preferably selected from the group consisting of hydroxylapatite, fluroroapatite, carboxyapatite, and mixtures thereof, and most preferably hydroxylapatite, in the range from 1:0.1 to 1:76, preferably in the range from 1:0.2 to 1:10, more preferably from 1:0.5 to 1:6, even more preferably from 1:0.9 to 1:2, and most preferably in a range from 1:0.95 to 1:1.2.

According to one embodiment of the present invention the at least one water-insoluble magnesium salt comprises whitlockite. Whitlockite is a mineral having the formula $Ca_9Mg(PO_4)_6(HPO_4)$, which may be formed on the surface of the calcium carbonate-comprising material during the process of the present invention. The surface-reacted calcium carbonate may further comprises whitlockite in an amount of at least 0.1 wt.-%, based on the total amount of the calcium carbonate and the at least one water-insoluble calcium salt, preferably in an amount of at least at least 0.5 wt.-%, more preferably in an amount of at least 1 wt.-%, and most preferably in an amount of at least 2 wt.-%.

According to one embodiment of the present invention surface-reacted calcium carbonate is provided comprising
   a calcium carbonate-comprising material, preferably calcite, and at least one water-insoluble calcium salt selected from tricalcium phosphate and/or apatitic calcium phosphate, preferably selected from the group consisting of hydroxylapatite, octacalcium phosphate, fluroroapatite, carboxyapatite, and mixtures thereof, and most preferably hydroxylapatite,
   wherein the surface-reacted calcium carbonate comprises
   (i) a specific surface area of from 20 to 200 $m^2/g$ measured using nitrogen and the BET method according to ISO 9277:2010;
   (ii) an intra-particle intruded specific pore volume in the range of from 0.1 to 2.3 $cm^3/g$ calculated from mercury porosimetry measurement, and/or an intra-particle pore size in a range of from 0.004 to 1.0 μm, determined from mercury porosity measurement, and (iii) whitlockite in an amount of at least 0.1 wt.-%, based on the total amount of the calcium carbonate and the at least one water-insoluble calcium salt, preferably in an amount of at least at least 0.5 wt.-%, more preferably in an amount of at least 1 wt.-%, and most preferably in an amount of at least 2 wt.-%. According to one embodiment the mass ratio of calcium carbonate to the at least one water-insoluble calcium salt is in the range of from 1:0.1 to 1:76, preferably in the range from 1:0.2 to 1:10, more preferably from 1:0.5 to 1:6, even more preferably from 1:0.9 to 1:2, and most preferably in a range from 1:0.95 to 1:1.2.

According to a preferred embodiment of the present invention surface-reacted calcium carbonate is provided comprising calcite and hydroxylapatite, wherein the surface-reacted calcium carbonate comprises
(i) a specific surface area of from 20 to 200 m²/g measured using nitrogen and the BET method according to ISO 9277:2010;
(ii) an intra-particle intruded specific pore volume in the range of from 0.1 to 2.3 cm³/g calculated from mercury porosimetry measurement, and/or an intra-particle pore size in a range of from 0.004 to 1.0 μm, determined from mercury porosity measurement, and
(iii) whitlockite in an amount of at least 0.1 wt.-%, based on the total amount of the calcite and hydroxylapatite, preferably in an amount of at least at least 0.5 wt.-%, more preferably in an amount of at least 1 wt.-%, and most preferably in an amount of at least 2 wt.-%,
wherein the mass ratio of calcite to hydroxylapatite is in the range of from 1:0.1 to 1:76, preferably in the range from 1:0.2 to 1:10, more preferably from 1:0.5 to 1:6, even more preferably from 1:0.9 to 1:2, and most preferably in a range from 1:0.95 to 1:1.2.

The surface-reacted calcium carbonate obtainable by a process of the present invention can be provided in form of a suspension of surface-reacted calcium carbonate, as a separated surface-reacted calcium carbonate or as a dried surface-reacted calcium carbonate. According to a preferred embodiment surface-reacted calcium carbonate is a dried surface-reacted calcium carbonate.

In case the surface-reacted calcium carbonate has been dried, the moisture content of the dried surface-reacted calcium carbonate can be between 0.01 and 5 wt.-%, based on the total weight of the dried surface-reacted calcium carbonate. According to one embodiment, the moisture content of the dried surface-reacted calcium carbonate is less than or equal to 1.0 wt.-%, based on the total weight of the dried surface-reacted calcium carbonate, preferably less than or equal to 0.5 wt.-%, and more preferably less than or equal to 0.2 wt.-%. According to another embodiment, the moisture content of the dried surface-reacted calcium carbonate is between 0.01 and 0.15 wt.-%, preferably between 0.02 and 0.10 wt.-%, and more preferably between 0.03 and 0.07 wt.-%, based on the total weight of the dried surface-reacted calcium carbonate.

The inventive surface-reacted calcium carbonate may also be provided and/or used in form of a composition. According to one aspect of the present invention, a composition is provided comprising a surface-reacted calcium carbonate according to present invention. Additionally other filler materials such as natural ground calcium carbonate, precipitated calcium carbonate, dolomite, and mixtures thereof may be present. The composition may comprise the surface-reacted calcium carbonate according to present invention in an amount of at least 20 wt.-%, based on the total weight of the composition, preferably at least 40 wt.-%, more preferably at least 60 wt.-%, and most preferably at least 80 wt.-%.

The surface-reacted calcium carbonate may be used for various applications.

According to one embodiment, the surface-reacted calcium carbonate obtainable by a process according to the present invention is used in polymer applications, paper coating applications, paper making, paints, coatings, sealants, printing inks, adhesives, food, feed, pharmaceuticals, concrete, cement, cosmetics, water treatment, engineered wood applications, plasterboard applications, packaging applications and/or agricultural applications. Preferably, the surface-reacted calcium carbonate obtainable by a process according to the present invention is used in polymer applications and/or food applications. According to one embodiment, the surface-reacted calcium carbonate is used as dried surface-reacted calcium carbonate.

According to a further aspect an article comprising a surface-reacted calcium carbonate according to the present invention is provided, wherein the article is selected from paper products, engineered wood products, plasterboard products, polymer products, hygiene products, medical products, healthcare products, filter products, woven materials, nonwoven materials, geotextile products, agriculture products, horticulture products, clothing, footwear products, baggage products, household products, industrial products, packaging products, building products, and construction products.

The scope and interest of the invention will be better understood based on the following examples which are intended to illustrate certain embodiments of the present invention and are non-limitative.

EXAMPLES

1. Measurement Methods

In the following, measurement methods implemented in the examples are described.

Particle Size Distribution

Volume determined median particle size $d_{50}$ (vol) and the volume determined top cut particle size $d_{98}$ (vol) was evaluated using a Malvern Mastersizer 2000 Laser Diffraction System (Malvern Instruments Plc., Great Britain). The $d_{50}$ (vol) or $d_{98}$ (vol) value indicates a diameter value such that 50% or 98% by volume, respectively, of the particles have a diameter of less than this value. The raw data obtained by the measurement was analyzed using the Mie theory, with a particle refractive index of 1.57 and an absorption index of 0.005. The methods and instruments are known to the skilled person and are commonly used to determine particle size distributions of fillers and pigments.

The weight determined median particle size $d_{50}$ (wt) and the weight determined top cut particle size $d_{98}$ (wt) was measured by the sedimentation method, which is an analysis of sedimentation behaviour in a gravimetric field. The measurement was made with a Sedigraph™ 5120 of Micromeritics Instrument Corporation, USA. The method and the instrument are known to the skilled person and are commonly used to determine particle size distributions of fillers and pigments. The measurement was carried out in an aqueous solution of 0.1 wt.-% $Na_4P_2O_7$. The samples were dispersed using a high speed stirrer and sonicated.

Specific Surface Area (SSA)

The specific surface area was measured via the BET method according to ISO 9277:2010 using nitrogen, following conditioning of the sample by heating at 250° C. for a period of 30 minutes. Prior to such measurements, the sample was filtered within a Buchner funnel, rinsed with deionised water and dried overnight at 90 to 100° C. in an oven. Subsequently, the dry cake was ground thoroughly in a mortar and the resulting powder was placed in a moisture balance at 130° C. until a constant weight was reached.

Intra-Particle Intruded Specific Pore Volume (in Cm³/g)

The specific pore volume was measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step was 20 seconds. The sample material was sealed in a 5 cm³ chamber powder penetrometer for analysis. The data were corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine inter-particle packing of the particles themselves. If they also have intra-particle pores, then this region appears bi-modal, and by taking the specific pore volume intruded by mercury into pores finer than the modal turning point, i.e. finer than the bi-modal point of inflection, the specific intra-particle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the inter-particle pore region and the intra-particle pore region, if present. Knowing the intra-particle pore diameter range it is possible to subtract the remainder inter-particle and inter-agglomerate pore volume from the total pore volume to deliver the desired pore volume of the internal pores alone in terms of the pore volume per unit mass (specific pore volume). The same principle of subtraction, of course, applies for isolating any of the other pore size regions of interest.

X-Ray Diffraction (XRD) Analysis

The prepared samples were analysed with a Bruker D8 Advance powder diffractometer obeying Bragg's law. This diffractometer consisted of a 2.2 kW X-ray tube, a sample holder, a θ-θ goniometer, and a VÅNTEC-1 detector. Nickel-filtered Cu Kα radiation was employed in all experiments. The profiles were chart recorded automatically using a scan speed of 0.7° per minute in 2θ (XRD GV 7600). The resulting powder diffraction pattern was classified by mineral content using the DIFFRAC$^{suite}$ software packages EVA and SEARCH, based on reference patterns of the ICDD PDF 2 database (XRD LTM 7603).

Quantitative analysis of the diffraction data, i.e. the determination of amounts of different phases in a multi-phase sample, has been performed using the DIFFRAC$^{suite}$ software package TOPAS (XRD LTM_7604). This involved modelling the full diffraction pattern (Rietveld approach) such that the calculated pattern(s) duplicated the experimental one.

Semi-Quantitative (SQ) calculations to estimate the rough mineral concentrations were carried out with the DIFFRAC$^{suite}$ software package EVA. The semi-quantitative analysis was performed considering the patterns relative heights and I/I$_{cor}$ values (I/I$_{cor}$: ratio between the intensities of the strongest line in the compound of interest and the strongest line of corundum, both measured from a scan made of a 50-50 by weight mixture).

2. Examples

Example 1 (Comparative Example)

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total weight of the aqueous suspension, is obtained. The ground calcium carbonate had a weight based particle size distribution of 90% less than 2 μm, as determined by sedimentation, a $d_{50}$ (wt) of 0.7 μm, and a $d_{98}$ (wt) of 3.4 μm.

In addition, phosphoric acid was diluted such that it contained 30% phosphoric acid, based on the total weight of the solution.

Whilst mixing the slurry, 2.3 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 4.1 μm, a volume determined top cut particle size $d_{98}$ of 8.0 μm, and a specific surface area SSA of 46.2 m²g⁻¹.

Example 2

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total weight of the aqueous suspension, is obtained. The ground calcium carbonate had a weight based particle size distribution of 90% less than 2 μm, as determined by sedimentation, a $d_{50}$ (wt) of 0.7 μm, and a $d_{98}$ (wt) of 3.4 μm.

In addition, phosphoric acid was diluted such that it contained 30% phosphoric acid, based on the total weight of the solution. 14 wt.-% Mg(NO$_3$)$_2$·6H$_2$O, based on the total weight of the neat phosphoric acid, was then added to this solution and the solution was stirred until it fully dissolved.

Whilst mixing the slurry, 2.4 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 3.8 μm, a volume determined top cut particle size $d_{98}$ of 7.8 μm, and a specific surface area SSA of 78.2 m²g⁻¹.

Example 3

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total mass of the aqueous suspension, is obtained. The ground calcium carbonate had a weight based particle size distribution of 90% less than 2 µm, as determined by sedimentation, a $d_{50}$ (wt) of 0.7 µm, and a $d_{98}$ (wt) of 3.4 µm.

In addition, phosphoric acid was diluted such that it contained 30% phosphoric acid, based on the total weight of the solution. 28.7 wt.-% $Mg(NO_3)_2 \cdot 6H_2O$, based on the total weight of the neat phosphoric acid, was then added to this solution and the solution was stirred until it fully dissolved.

Whilst mixing the slurry, 2.5 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 3.9 µm, a volume determined top cut particle size $d_{98}$ of 8.0 µm, and a specific surface area SSA of 84.2 $m^2g^{-1}$.

Example 4

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total weight of the aqueous suspension, is obtained. The ground calcium carbonate had a weight based particle size distribution of 90% less than 2 µm, as determined by sedimentation, a $d_{50}$ (wt) of 0.7 µm, and a $d_{98}$ (wt) of 3.4 µm.

In addition, phosphoric acid was diluted such that it contained 30% phosphoric acid, based on the total weight of the solution. 43.0% $Mg(NO_3)_2 \cdot 6H_2O$, based on the total weight of the neat phosphoric acid, was then added to this solution and the solution was stirred until it fully dissolved.

Whilst mixing the slurry, 2.6 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 3.6 µm, a volume determined top cut particle size $d_{98}$ of 7.3 µm, and a specific surface area SSA of 79.5 $m^2g^{-1}$.

Example 5 (Comparative Example)

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total weight of the aqueous suspension, is obtained. The ground calcium carbonate had a weight based particle size distribution of 90% less than 2 µm, as determined by sedimentation, a $d_{50}$ (wt) of 0.7 µm, and a $d_{98}$ (wt) of 3.4 µm.

In addition, phosphoric acid was diluted such that it contained 30% phosphoric acid, based on the total weight of the solution.

Whilst mixing the slurry, 2.3 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 3.9 µm, a volume determined top cut particle size $d_{98}$ of 8.0 µm, and a specific surface area SSA of 43.9 $m^2g^{-1}$.

Example 6

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total weight of the aqueous suspension, is obtained. The ground calcium carbonate had a weight based particle size distribution of 90% less than 2 µm, as determined by sedimentation, a $d_{50}$ (wt) of 0.7 µm, and a $d_{98}$ (wt) of 3.4 µm.

In addition, phosphoric acid was diluted such that it contained 30% phosphoric acid, based on the total weight of the solution. 4.5 wt.-% $MgSO_4 \cdot 7H_2O$, based on the total weight of the neat phosphoric acid, was then added to this solution and the solution was stirred until it fully dissolved.

Whilst mixing the slurry, 2.4 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 4.0 µm, a volume determined top cut particle size $d_{98}$ of 9.1 µm, and a specific surface area SSA of 93.1 $m^2g^{-1}$.

Example 7

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total weight of the aqueous suspension, is obtained. The ground calcium carbonate had a weight based particle size distribution of 90% less than 2 µm, as determined by sedimentation, a $d_{50}$ (wt) of 0.7 µm, and a $d_{98}$ (wt) of 3.4 µm.

In addition, phosphoric acid was diluted such that it contained 30% phosphoric acid, based on the total weight of the solution. 13.8 wt.-% $MgSO_4 \cdot 7H_2O$, based on the total weight of the neat phosphoric acid, was then added to this solution and the solution was stirred until it fully dissolved.

Whilst mixing the slurry, 2.6 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 3.8 µm, a volume determined top cut particle size $d_{98}$ of 7.7 µm, and a specific surface area SSA of 92.7 $m^2g^{-1}$.

Example 8

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total weight of the aqueous suspension, is obtained. The ground calcium carbonate had a weight based particle size distribution of 90% less than 2 μm, as determined by sedimentation, a $d_{50}$ (wt) of 0.7 μm, and a $d_{98}$ (wt) of 3.4 μm.

In addition, phosphoric acid was diluted such that it contained 30% phosphoric acid, based on the total weight of the solution. 16.4 wt.-% $MgBr_2 \cdot 6H_2O$, based on the total weight of the neat phosphoric acid, was then added to this solution and the solution was stirred until it fully dissolved.

Whilst mixing the slurry, 2.4 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 4.2 μm, a volume determined top cut particle size $d_{98}$ of 9.7 μm, and a specific surface area SSA of 70.9 $m^2g^{-1}$.

Example 9

Surface-reacted calcium carbonate was obtained by preparing 10 litres of an aqueous suspension of ground calcium carbonate in a mixing vessel by adjusting the solids content of a ground marble calcium carbonate from Hustadmarmor Norway such that a solids content of 20 wt.-%, based on the total weight of the aqueous suspension, is obtained. The ground calcium carbonate had a weight based particle size distribution of 90% less than 2 μm, as determined by sedimentation, a $d_{50}$ (wt) of 0.7 μm, and a $d_{98}$ (wt) of 3.4 μm.

In addition, phosphoric acid was diluted such that it contained 30% phosphoric acid, based on the total weight of the solution. 49.3 wt.-% $MgBr_2 \cdot 6H_2O$, based on the total weight of the neat phosphoric acid, was then added to this solution and the solution was stirred until it fully dissolved.

Whilst mixing the slurry, 2.6 kg of the phosphoric acid solution was added over 10 minutes. Throughout the whole experiment the temperature of the suspension was maintained at 70° C.±1° C. Finally, after the addition of the acid, the suspension was stirred for additional 5 minutes before removing it from the vessel and allowing it to cool.

The obtained surface-reacted calcium carbonate had a volume determined median particle size $d_{50}$ of 3.9 μm, a volume determined top cut particle size $d_{98}$ of 8.4 μm, and a specific surface area SSA of 72.8 $m^2g^{-1}$.

Results

The prepared surface-reacted calcium carbonate particles were characterized with respect to their particles size distribution, their specific surface area, and their porosity, as described above. The results as well as the employed magnesium salt and its concentration are compiled in Table 1 below. Furthermore, XRD measurements of the surface-reacted calcium carbonate particles prepared according to Examples 1, and 3 to 5 were carried out in order to determine their crystalline structure (see Table 2).

It can be gathered from Table 1 that the addition of the water-soluble, inorganic magnesium salt led to a noticeable increase of the BET values, compared to comparative examples 1 and 5. It can also be seen from said experimental data that the increase of the BET can be controlled by the selection of a specific magnesium salt.

Furthermore, Table 1 shows that the intra-particle intruded specific pore volume of the surface-reacted calcium carbonate can be modified in a predetermined way. While a lower concentration of 4.1 mmol $Mg^{2+}$/g $CaCO_3$ lead to an increase in intra-particle intruded specific pore volume, compared to comparative examples 1 and 5, the addition of magnesium salt concentrations of 8.2 mmol $Mg^{2+}$/g $CaCO_3$ or more resulted in an intra-particle intruded specific pore volume being lower than that of the comparative example. It is also to be noted that the particles size distribution of the surface-reacted calcium carbonate particles is not affected significantly, as can be seen from the $d_{50}$ and $d_{98}$ values in Table 1.

The XRD analysis of the surface-reacted calcium carbonate particles of Examples 1, and 3 to 5 compiled in Table 2 reveals that the inventive samples (Examples 3 and 4) contain a higher amount of hydroxylapatite, which indicates that in the inventive particles more crystalline calcium phosphate has been formed leaving only little amorphous calcium phosphate remaining. In other words, the inventive surface-reacted calcium carbonate particles exhibit a higher crystallinity. Moreover, the magnesium mineral whitlockite is clearly detectable in the surface-reacted calcium carbonates obtained in inventive Examples 3 to 4.

TABLE 1

Characteristics of the surface-reacted calcium carbonate particles prepared according to Examples 1 to 9.

| Example | Magnesium salt | Amount of $Mg^{2+}$ [wt.-% $Mg^{2+}$/ total weight $CaCO_3$] | Infra-particle intruded specific pore volume [$cm^3g^{-1}$] . . . | . . . for pore diameter range [μm] | SSA [$m^2g^{-1}$] | $d_{50}$ [μm] | $d_{98}$ [μm] |
|---|---|---|---|---|---|---|---|
| Example 1 (comparative) | — | — | 0.88 | 0.004-0.34 | 46.2 | 4.1 | 8.0 |
| Example 2 | $Mg(NO_3)_2 \cdot 6H_2O$ | 0.4 | 0.94 | 0.004-0.31 | 78.2 | 3.8 | 7.8 |
| Example 3 | $Mg(NO_3)_2 \cdot 6H_2O$ | 0.8 | 0.75 | 0.004-0.25 | 84.2 | 3.9 | 8.0 |
| Example 4 | $Mg(NO_3)_2 \cdot 6H_2O$ | 1.2 | 0.60 | 0.004-0.20 | 79.5 | 3.6 | 7.3 |
| Example 5 (comparative) | — | — | 0.88 | 0.004-0.38 | 43.9 | 3.9 | 8.0 |
| Example 6 | $MgSO_4 \cdot 7H_2O$ | 0.4 | 0.90 | 0.004-0.24 | 93.1 | 4.0 | 9.1 |
| Example 7 | $MgSO_4 \cdot 7H_2O$ | 1.2 | 0.57 | 0.004-0.17 | 92.7 | 3.8 | 7.7 |
| Example 8 | $MgBr_2 \cdot 6H_2O$ | 0.4 | 1.05 | 0.004-0.27 | 70.9 | 4.2 | 9.7 |
| Example 9 | $MgBr_2 \cdot 6H_2O$ | 1.2 | 0.68 | 0.004-0.38 | 72.8 | 3.9 | 8.4 |

TABLE 2

Quantitative Rietvield analysis of surface-reacted calcium carbonate particles prepared according to Examples 1 to 5. Data are normalized to 100% crystalline material and values are expressed in wt.-%.

| Mineral [%] | Formula | Example 1 (comparative) | Example 3 | Example 4 | Example 5 (comparative) |
|---|---|---|---|---|---|
| Calcite | $CaCO_3$ | 57 | 49 | 48 | 56 |
| Hydroxylapatite | $Ca_5(PO_4)_3(OH)$ | 43 | 50 | 48 | 44 |
| Whitlockite | $Ca_9Mg(PO_4)_6(HPO_4)$ | — | 1 | 4 | — |
| Total | | 100 | 100 | 100 | 100 |

The invention claimed is:

1. A surface-reacted calcium carbonate comprising
a calcium carbonate-comprising material, and at least one water-insoluble calcium salt selected from tricalcium phosphate and/or apatitic calcium phosphate,
wherein the surface-reacted calcium carbonate comprises
(i) a specific surface area of from 20 to 200 m²/g measured using nitrogen and the BET method according to ISO 9277:2010;
(ii) an intra-particle intruded specific pore volume in the range of from 0.1 to 2.3 cm³/g calculated from mercury porosimetry measurement, and/or an intra-particle pore size in a range of from 0.004 to 1.0 μm, determined from mercury porosity measurement, and
(iii) whitlockite in an amount of at least 0.1 wt.-%, based on the total amount of the calcium carbonate and the at least one water-insoluble calcium salt.

2. The surface-reacted calcium carbonate of claim 1, wherein the mass ratio of calcium carbonate to the at least one water-insoluble calcium salt is in the range of from 1:0.1 to 1:76.

3. An article comprising a surface-reacted calcium carbonate according to claim 1, wherein the article is selected from paper products, engineered wood products, plasterboard products, polymer products, hygiene products, medical products, healthcare products, food products, feed products, filter products, woven materials, nonwoven materials, geotextile products, agriculture products, horticulture products, clothing, footwear products, baggage products, household products, industrial products, packaging products, building products, and construction products.

4. The surface-reacted calcium carbonate of claim 1, wherein the calcium carbonate-comprising material is calcite, and the at least one water-insoluble calcium salt is selected from the group consisting of hydroxylapatite, fluoroapatite, carboxyapatite, and mixtures thereof.

5. The surface-reacted calcium carbonate of claim 1, wherein whitlockite is in an amount of at least 2 wt.-%.

6. The surface-reacted calcium carbonate of claim 1, wherein the mass ratio of calcium carbonate to the at least one water-insoluble calcium salt is in the range of from 1:0.95 to 1:1.2.

7. A process for producing a surface-reacted calcium carbonate according to claim 1, the process comprising the steps of:
a) providing a calcium carbonate-comprising material,
b) providing at least one inorganic acid,
c) providing at least one water-soluble, inorganic magnesium salt, and
d) treating the calcium carbonate-comprising material of step a) with the at least one inorganic acid of step b) and carbon dioxide in an aqueous medium to form an aqueous suspension of surface-reacted calcium carbonate,
wherein the carbon dioxide is formed in situ by the inorganic acid treatment and/or is supplied by an external source, and
wherein the at least one water-soluble, inorganic magnesium salt of step c) is added before, during and/or after step d).

8. The process of claim 7, wherein in step d) the calcium carbonate-comprising material is treated with a solution comprising the at least one inorganic acid of step b) and the at least one water-soluble, inorganic magnesium salt of step c).

9. The process of claim 7, wherein the carbon dioxide is formed in situ by the inorganic acid treatment and/or step d) is carried out at a temperature from 20 to 90° C., preferably from 30 to 85° C.

10. The process of claim 7, wherein the calcium carbonate-comprising material is a natural ground calcium carbonate, the at least one inorganic acid is phosphoric acid, the at least one water-soluble, inorganic magnesium salt is selected from the group consisting of magnesium bromide, magnesium nitrate, magnesium sulfate, hydrates thereof, and mixtures thereof, and in step d) the calcium carbonate-comprising material is treated with a solution comprising the at least one inorganic acid of step b) and the at least one water-soluble, inorganic magnesium salt of step c).

11. The process of claim 7, wherein the calcium carbonate-comprising material is a natural ground calcium carbonate and/or a precipitated calcium carbonate.

12. The process of claim 7, wherein the calcium carbonate-comprising material is in form of particles having a weight median particle size $d_{50}$ (wt) from 0.05 to 10 μm, and/or a weight top cut particle size $d_{98}$ (wt) from 0.15 to 55 μm.

13. The process of claim 7, wherein the at least one inorganic acid is selected from the group consisting of hydrochloric acid, sulphuric acid, sulphurous acid, phosphoric acid, an inorganic acid salt thereof, and mixtures thereof.

14. The process of claim 7, wherein the at least one inorganic acid is provided in an amount from 1 to 60 wt.-%, based on the total weight of the calcium carbonate-comprising material.

15. The process of claim 7, wherein the at least one water-soluble, inorganic magnesium salt is selected from the group consisting of magnesium chloride, magnesium nitrate, magnesium sulfate, magnesium hydrogen sulfate, magnesium bromide, magnesium iodide, magnesium chlorate, magnesium iodate, hydrates thereof, and mixtures thereof.

16. The process of claim 7, wherein the at least one water-soluble, inorganic magnesium salt is provided in an amount from 0.3 to 270 mmol $Mg^{2+}$/mol $Ca^{2+}$ of the calcium carbonate-comprising material.

17. The process of claim 7, wherein the calcium carbonate-comprising material is in form of particles having a weight median particle size $d_{50}$ (wt) from 0.6 to 1.2 μm and/or a weight top cut particle size $d_{98}$ (wt) from 3 to 7 μm.

18. The process of claim 7, wherein the at least one inorganic acid is provided in an amount from 10 to 40 wt.-%, based on the total weight of the calcium carbonate-comprising material.

19. The process of claim 7, wherein the at least one inorganic acid is selected from the group consisting of hydrochloric acid, sulphuric acid, sulphurous acid, phosphoric acid, and mixtures thereof.

20. The process of claim 7, wherein the calcium carbonate-comprising material is a natural ground calcium carbonate and/or a precipitated calcium carbonate;
  wherein the natural ground calcium carbonate is selected from the group consisting of marble, chalk, limestone, and mixtures thereof; and
  wherein the precipitated calcium carbonate is selected from the group consisting of precipitated calcium carbonates having an aragonitic, vateritic or calcitic crystal form, and mixtures thereof.

* * * * *